Jan. 27, 1925.
O. E. WEST
1,524,070
GRAIN TRIMMING DEVICE
Filed July 10, 1923
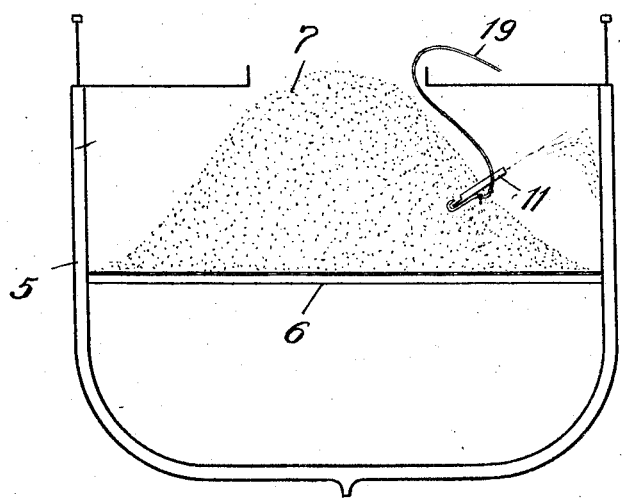
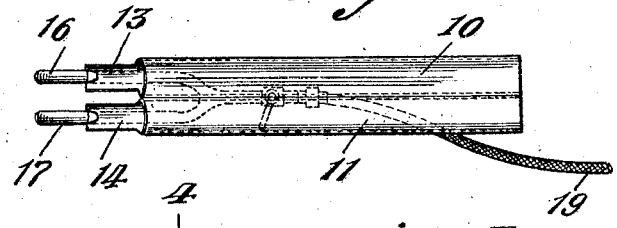
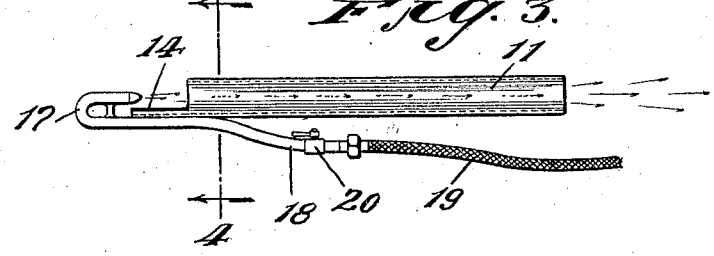
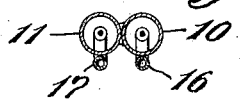
INVENTOR
Oscar E. West
BY Howard E. Trone
His ATTORNEY Patented Jan. 27, 1925.

1,524,070

UNITED STATES PATENT OFFICE.

OSCAR E. WEST, OF NEW ORLEANS, LOUISIANA.

GRAIN-TRIMMING DEVICE.

Application filed July 10, 1923. Serial No. 650,587.

*To all whom it may concern:*

Be it known that I, OSCAR E. WEST, a subject of the King of Great Britain, residing at New Orleans, in the parish of Orleans and State of Louisiana, have invented certain new and useful Improvements in Grain-Trimming Devices, of which the following is a specification.

The present invention relates to devices for trimming or moving grain and other materials; and its general object is to provide a new and improved device of a pneumatic character for these purposes which will be simple in construction, efficient in operation, and freely and manually movable within the hold of a vessel or at any other location in which it may be used.

Up to the present time, it has been customary to trim grain and other materials, in vessels, barges, bins, railway cars and other places, largely by shovels wielded by men. Such a method of trimming is necessarily slow and expensive, and often requires a large number of men who may be difficult to get at the time the work is required to be done. The device which forms the subject of the present invention may easily be handled by one man, and in a given time will do the work of many men.

Generally speaking, the invention is characterized by a freely and manually movable, pneumatically operated device of an improved form, one end of which is inserted in a pile of grain or other material which is thus fed to the device by gravity and is projected to a considerable distance from the outer end of the device.

More specifically considered, the invention comprises a pipe having a diameter sufficiently large to permit passage of the material to be trimmed, said pipe at one end being cut away to leave a lip, and being provided with a nozzle (adapted to be attached to a pipe supplying compressed air) which is secured to the outside of said pipe in line with said lip and extends around the end of the latter, said nozzle being thus arranged to direct the compressed air axially along said lip and into and through said material conveying pipe. In use, the cut away end of the material-conveying pipe and the nozzle are thrust into a pile of the material to be trimmed, and the latter feeds by gravity on to the lip and into the path of the compressed air escaping from the nozzle, with the result that the material is entrained in the air and is carried into and through and is projected from the material-conveying pipe. By inserting the nozzle end of the device in the pile of grain or other material to be trimmed or moved, and by properly directing the nozzle end of the device, the material may be taken from any part of the pile and projected to the desired point within the range of the device.

The invention will be understood from the following description, taken in connection with the accompanying drawing, in which Figure 1 is a sectional elevation, more or less diagrammatic, of a vessel showing the trimming device inserted in the pile of grain or other material and operating to project the same to points at or beyond the edge of the pile; Figure 2 is a plan view of the device; Figure 3 is a side elevation thereof; and Figure 4 is a sectional transverse elevation on the line 4—4 of Figure 3. Like parts are referred to throughout the various figures by the same reference characters.

Referring to the drawing, the vessel 5 is shown as provided with a deck 6 upon which, through a hatchway, has been dumped a pile of grain or other material. In that Figure, the device embodying the invention is shown inserted in the pile of material, and in the operation of projecting material from the pile to the sides of the vessel for the purpose of trimming the cargo, it being understood that a man (not shown) would be handling the device and changing its location in the pile of material or its direction of projection, as might be necessary.

Referring to Figures 2, 3 and 4, the device is shown as comprising pipes 10 and 11 which are secured together as shown in any suitable manner, as by welding. These pipes 10 and 11 have a diameter capable of permitting the free passage through them of the material to be trimmed. For use in moving grain, I have found that a 1½ inch diameter pipe approximately four feet long is satisfactory, when the other parts of the device are proportioned as hereinafter described. As shown in Figures 2 and 3, the pipes 10 and 11, at one end, have the major portions of their walls cut away for a short distance back from the end, leaving lips 13 and 14, of the form shown. Extending slightly over the ends of the lips 13 and 14, are nozzles 16 and 17, of the form shown, the openings in which are axially arranged with reference to the pipes 10 and 11 as shown. The nozzles 16 and 17 are secured to the outside of the pipes 10 and 11 and in line with the lips 13 and 14 in any suitable manner, as by welding, and both nozzles are attached to a pipe 18 to which is coupled a hose 19 leading from a suitable supply of compressed air. A valve 20, capable of being manually operated, is located in the pipe 18 and serves to control the supply of compressed air to the nozzles 16 and 17. With pipes 10 and 11 having diameters of the size hereinbefore mentioned, it has been found that the nozzles 16 and 17 may be made of $\frac{1}{2}$ inch pipe at the end of which the opening through which the air escapes is reduced to approximately $\frac{3}{32}$ of an inch in diameter. It has also been found that, for the trimming of grain, this device gives good results in the projecting of the grain up to a distance of approximately 40 feet from the point at which the device is located, with air under pressures of from 80 to 100 pounds per square inch, lower pressures being preferably employed for projecting to the shorter distances than for projection to longer ones.

In operation, as hereinbefore mentioned, the nozzle end of the device is inserted in the pile of grain or other material sufficiently far to bury the nozzles 16 and 17, the lips 13 and 14 and a portion of the pipes 10 and 11 adjacent the said lips. The device is inserted in the pile of material with the lips 13 and 14 downward, with the result that as the air escaping from the nozzles 13 and 14 engages the grain or other material and carries it into and through the pipes 10 and 11, additional material will flow from the pile on to the lips 13 and 14 and will be entrained in and carried along by the air.

While, in the form of the invention herein described, there are two pipes 10 and 11 and two nozzles 16 and 17, it is to be understood that the invention may equally well be embodied in a device having only one pipe and one nozzle or in a device having more than two pipes and nozzles. It is also to be understood that the device may be modified in many respects without departing from its spirit as defined in the claim hereto appended.

What I claim is:

For use in the trimming of grain and other materials, a freely and manually movable device comprising a material conveying pipe open at both ends and having at one end the major portion of its wall cut away for a short distance leaving a lip, and a nozzle adapted to be attached to a pipe carrying compressed air secured to the outside of said material conveying pipe in line with said lip and extending around the end of the latter and arranged to direct the compressed air axially along said lip and into and through said pipe, whereby material to be trimmed is supported by said lip and while so supported is entrained in the air escaping from said nozzle and is carried through and projected from said pipe.

Signed at New York, N. Y. this 9th day of July, 1923.

OSCAR E. WEST.